United States Patent [19]

Mueller-Mall et al.

[11] 4,265,796

[45] May 5, 1981

[54] PREPARATION OF AQUEOUS POLYACRYLATE DISPERSIONS HAVING IMPROVED FLOW CHARACTERISTICS

[75] Inventors: Rudolf Mueller-Mall, Karlsruhe; Kurt Wendel, Ludwigshafen; Hans J. Geelhaar, Frankenthal; Michael Melan, Wachenheim, all of Fed. Rep. of Germany

[73] Assignee: BASF Aktiengesellschaft, Ludwigshafen, Fed. Rep. of Germany

[21] Appl. No.: 73,300

[22] Filed: Sep. 7, 1979

[30] Foreign Application Priority Data

Sept. 30, 1978 [DT] Fed. Rep. of Germany ........... 2842719

[51] Int. Cl.$^3$ .................. C08L 33/08; C08L 33/10
[52] U.S. Cl. .................. 260/29.6 R; 260/29.6 T; 260/29.6 TA
[58] Field of Search ............. 260/29.6 R, 29.6 T, 260/29.6 TA; 526/78, 82, 328, 328.5, 329.2, 329.5, 329.7

[56] References Cited

U.S. PATENT DOCUMENTS

| | | | |
|---|---|---|---|
| 3,248,356 | 4/1966 | Snyder | 526/78 |
| 3,513,120 | 5/1970 | Pohlemann et al. | 526/78 |
| 3,546,154 | 12/1970 | Hwa et al. | 260/29.6 R |
| 3,876,596 | 4/1975 | Grubert et al. | 260/29.6 WA |
| 4,039,500 | 8/1977 | Bassett et al. | 260/29.6 R |

FOREIGN PATENT DOCUMENTS

| | | |
|---|---|---|
| 912068 | 5/1960 | United Kingdom . |
| 1152860 | 5/1969 | United Kingdom . |
| 1277877 | 5/1972 | United Kingdom . |
| 1466660 | 3/1977 | United Kingdom . |
| 1524018 | 9/1978 | United Kingdom . |

*Primary Examiner*—Harry Wong, Jr.
*Attorney, Agent, or Firm*—Oblon, Fisher, Spivak, McClelland & Maier

[57] ABSTRACT

Aqueous polyacrylate dispersions having improved flow characteristics are prepared by polymerizing esters of acrylic acid and/or methacrylic acid and alkanols of 1 to 10 carbon atoms, with or without admixture of styrene and/or vinyl esters and/or water-soluble monoolefinically unsaturated comonomers (the monomer feed being in the form of an emulsion), in aqueous emulsion in the presence of a free radical polymerization initiator, a protective colloid, a nonionic emulsifier and a regulator, at least a part of the protective colloid being introduced into an aqueous initial charge, and a water-soluble regulator being employed in the initial charge and in the feed.

8 Claims, No Drawings

PREPARATION OF AQUEOUS POLYACRYLATE DISPERSIONS HAVING IMPROVED FLOW CHARACTERISTICS

The present invention relates to a process for the preparation of aqueous polyacrylate dispersions having improved flow characteristics, such as are used, in particular, as binders for paints.

It has long been known that aqueous polyacrylate dispersions may be prepared by polymerizing esters of acrylic acid and/or methacrylic acid and alkanols of 1 to 10 carbon atoms together with from 0 to 50% by weight of styrene and/or from 0 to 20% by weight of vinyl esters and/or from 0 to 10% by weight of water-soluble monoolefinically unsaturated comonomers, for example acrylic acid, methacrylic acid, itaconic acid, acrylamide, methacrylamide and the like, in aqueous emulsion at from 30° to 95° C. in the presence of a free radical polymerization initiator, in particular a water-soluble peroxide, eg. a persulfate. In general, this process employs from 0.5 to 5% by weight of anionic and/or nonionic emulsifiers. The emulsion polymerization is in general carried out batchwise, the monomers being present in part in an aqueous initial charge, which also contains the polymerization initiator and the emulsifier, whilst the remainder of the monomers are fed in after the start of the emulsion polymerization at an elevated temperature, either in the undiluted form or as an aqueous emulsion. The rheological properties of the polyacrylate dispersions prepared by such conventional processes however are not fully satisfactory when the dispersions are used as paints, or as paint binders; frequently, it would be desirable for the dispersions to accept a large amount of filler and at the same time exhibit improved flow characteristics.

Protective colloids, such as polyvinyl alcohols, hydroxyethylcelluloses and vinylpyrrolidone copolymers have, in the prior art, been added after polymerization in order to increase the viscosity of the polyacrylate dispersions. It is true that this improves the compatibility with the pigments used in paints, but the films produced from such dispersions exhibit a sharp increase in water sensitivity. To achieve better flow characteristics, and to save having to add a protective colloid subsequently, the emulsion polymerization of esters of acrylic acid has, in the prior art, also been carried out in the presence of protective colloids. This however frequently leads to coagulation, especially where only acrylic acid esters (ie. without comonomers, such as styrene and vinyl esters) are emulsion-polymerized, or very viscous polyacrylate dispersions having poor flow are obtained, which are unsuitable for use as paint binders. Attempts have also already been made, in the process of British Pat. No. 1,155,275, to add a protective colloid, when emulsion-polymerizing acrylic acid esters, only after a certain conversion in the polymerization mixture has been reached. However, it is difficult to choose this conversion correctly, so that reproducible control of the viscosity is only possible with certain limitations.

Finally, it is also known to use regulators, with or without the addition of protective colloids, in the emulsion polymerization of esters of acrylic acid (cf. British Pat. No. 1,466,660, German Laid-Open Application DOS No. 2,256,154 (corresponding to U.S. Pat. No. 3,876,596), British Pat. No. 1,277,877, British Pat. No. 1,152,860, German Laid-Open Application DOS No. 2,620,189 (corresponding to British Pat. No. 1,524,018 and to South African Published Patent Application No. 77/2,690) and British Pat. No. 912,068). The regulators disclosed are alkylmercaptans and arylmercaptans, especially dodecylmercaptan, which are virtually insoluble in water, but relatively high concentrations of the regulators must be employed and these can lead to an odor nuisance.

We have found that aqueous polyacrylate dispersions having improved flow characteristics can be prepared advantageously by polymerizing at least 20% by weight of esters of acrylic acid and/or methacrylic acid with alkanols of 1 to 10 carbon atoms, together with from 0 to 50% by weight of styrene and/or from 0 to 20% by weight of vinyl esters and/or from 0 to 10% by weight of water-soluble monoolefinically unsaturated comonomers (the monomer feed being in the form of an emulsion), in aqueous emulsion at from 30° to 95° C. in the presence of a conventional free radical polymerization initiator, and of from 0.01 to 2% by weight of a protective colloid, from 0.5 to 5% by weight of a nonionic emulsifier and from 0.05 to 5% by weight of a regulator, the percentages by weight in each case being based on the total amount of the monomers, if (a) at least a part of the protective colloid is introduced into an aqueous initial charge containing small proportions of the monomers and (b) a water-soluble regulator is employed in the initial charge and in the feed.

Suitable esters of acrylic acid and/or methacrylic acid are especially those of alkanols of 1 to 4 carbon atoms, for example methanol, ethanol, n-propanol, n-butanol and isobutanol, and also of 2-ethylhexanol. Monomers of particular interest are methyl methacrylate, ethyl acrylate, n-butyl acrylate, isobutyl acrylate, 2-ethylhexyl acrylate and 2-ethylhexyl methacrylate. Tertiary butyl acrylate and tertiary butyl methacrylate are also suitable monomers.

Suitable vinyl esters are, in particular, vinyl acetate, vinyl propionate, vinyl laurate and vinyl pivalate. Suitable water-soluble monoolefinically unsaturated comonomers are, in particular, $\alpha,\beta$-monoolefinically unsaturated monocarboxylic acids and dicarboxylic acids, preferably of 3 to 5 carbon atoms, and their amides, the nitrogen atoms of said amides optionally being substituted, monoalkyl esters of alkanols of 1 to 4 carbon atoms with $\alpha,\beta$-monoolefinically unsaturated dicarboxylic acids of 4 or 5 carbon atoms, vinylsulfonic acid and its water-soluble salts. Particular examples are acrylic acid, methacrylic acid, itaconic acid, acrylamide, methacrylamide, monoethyl maleate, monomethyl maleate, mono-n-butyl maleate, N-methylacrylamide, N-n-butylmethacrylamide, N-alkylolamides (where alkyl is in most cases of 1 to 4 carbon atoms) of acrylic acid and methacrylic acid, eg. N-methylolacrylamide and N-methylolmethacrylamide, N-n-butoxymethylacrylamide and N-ethoxymethyl-methacrylamide. The proportion of such water-soluble comonomers in the copolymers is in most cases from 0.1 to 7% by weight and is preferably from 0.5 to 5% by weight, based on the total amount of the monomers.

Suitable protective colloids, which are preferably employed in amounts of from 0.05 to 1.5% by weight, are in particular hydroxyalkylcelluloses which in 2% strength aqueous solution at 20° C. have a viscosity of from 10 to 1,000 mPa.s, especially hydroxyethylcelluloses, polyvinyl alcohols, and water-soluble polymers of N-vinylpyrrolidone, which in most cases have K values (determined by the method of H. Fikentscher, Cellulosechemie, 13 (1932), 58 et seq.) of from 30 to 150, especially from 50 to 100, and which in general contain at least 20%, preferably from 40 to 100%, of their weight, of vinylpyrrolidone as copolymerized units, whilst the comonomers present as copolymerized units are α,β-monoolefinically unsaturated monocarboxylic acids and/or dicarboxylic acids, mostly of 3 to 5 carbon atoms, and/or their amides, especially acrylamide and methacrylamide, as well as from 0 to 30% by weight of lower acrylic acid esters, in general with alkanols of 1 to 2 carbon atoms, especially methyl acrylate, and/or lower vinyl esters, especially vinyl acetate and vinyl propionate. Other suitable protective colloids include conventional carboxymethylcelluloses.

The nonionic emulsifiers also to be employed are preferably used in an amount of from 1 to 3% by weight, based on the monomers. Particularly suitable emulsifiers are oxyalkylated, preferably oxyethylated, fatty alcohols, fatty amines, fatty acid amides and/or monoalkylphenols, where alkyl is mostly of 8 to 12 carbon atoms, all of which products contain from 5 to 30, especially from 10 to 25, ethylene oxide units in the molecule; examples include oxyethylated lauryl alcohol, oxyethylated oleyl alcohol, oxyethylated sperm oil alcohol, oxyethylated stearyl alcohol, oxyethylated stearamide, oxyethylated oleylamide, oxyethylated oleic acid, oxyethylated p-n-nonylphenol, oxyethylated p-iso-octylphenol and oxyethylated p-n-dodecylphenol. In addition to the nonionic emulsifiers, anionic emulsifiers can also be present in amounts of from 0 to 3, preferably from 0.5 to 2, % by weight, based on the amount of monomers. Preferred suitable anionic emulsifiers are sulfuric acid esters of fatty alcohols, eg. lauryl sulfate, sulfonation products of oxyalkylated, especially oxyethylated, alkylphenols, where alkyl is mostly of 8 to 12 carbon atoms, especially p-n-nonylphenol, p-n-dodecylphenol and p-isooctylphenol, water-soluble alkali metal salts of fatty acids, eg. sodium stearate and sodium oleate, and sulfonated and alkylated bis-phenylethers.

The presence of water-soluble molecular weight regulators is of great importance in the novel process. The amount of these molecular weight regulators is preferably from 0.1 to 0.5% by weight, based on the total amount of monomers. In general, the solubility of the molecular weight regulator in water at room temperature, ie. at 20° C., should be at least 50 g/l, preferably at least 100 g/l. Suitable molecular weight water-soluble regulators are especially thioglycolic acid and thiodiglycol, but also but-1-en-3-ol, isopropanol, vinylglycol, cyclohexylamine hydrochloride, hydroxylammonium sulfate, but-2-ene-1,4-diol and thiodiacetic acid. Conventional molecular weight regulators, eg. dodecylmercaptan, the solubility of which in water is less than 10 g/l, are unsuitable for the present process, since they do not lower the viscosity of the dispersion to the required degree and give pasty, intermittent flow characteristics.

The process according to the invention employs the emulsion feed method, in which a proportion, in most cases 10–30%, of the total monomers is introduced into an aqueous initial charge which also contains a proportion of the free radical polymerization initiator, protective colloid, emulsifier and regulator. The initial charge is in general heated to the polymerization temperature and when the polymerization has started the remaining monomers are fed in as an aqueous emulsion, together with or separately from the remaining polymerization initiator, regulator, protective colloid and emulsifier.

The remaining emulsified monomers may be added in equal or variable separate portions or, preferably, continuously at the rate at which the polymerization proceeds. In the novel process, the ratio of water-soluble regulator:emulsifier:protective colloid:monomer in the initial charge may be identical to or different from the ratio in the emulsion feed. The ratio of monomer:aqueous phase can also be identical or different in the initial charge and the emulsion feed, and is in general from 4:100 to 60:100.

The entire protective colloid can be introduced into the initial charge. However, it has proved particularly advantageous to use only a part of the protective colloid in the initial charge, for example about ⅓ and preferably about half the total amount, and to add the remainder of the protective colloid to the feed.

In a preferred embodiment of the process, only a proportion, for example from 10 to 50%, preferably from 20 to 30%, of the total weight of the water-soluble regulator is introduced into the aqueous initial charge and the remainder is added to the polymerization mixture during the emulsion feed or monomer feed, in increasing amounts per unit time. This can be achieved particularly advantageously by adding that part of the regulator which was not present in the initial charge together with the emulsion feed in such a way that its concentration in the emulsion feed is increased continuously over the entire feed period. In practice this can be done, for example, by uniformly continuously dosing the emulsion feed, which contains a proportion of the water-soluble regulator which has not been introduced into the initial charge, with the remainder of the water-soluble regulator, as a result of which its concentration in the monomer feed increases uniformly. In this preferred embodiment it is also possible to add the remainder of the regulator, ie. the proportion which has neither been introduced into the initial charge nor is present in the emulsion feed at the time of starting the feed, to the emulsion feed in amounts increasing per unit time whilst the feed is being added to the polymerization mixture. During the polymerization, the reaction mixture is preferably kept at from 45° to 80° C. When all the feed has been added, the polymerization is allowed to finish in the conventional manner, and the mixture is then allowed to cool.

The novel process, in particular its preferred embodiment, gives polyacrylate dispersions which combine excellent pigment compatibility and an advantageous viscosity, mostly of from 100 to 1,000 mPa.s, with particularly advantageous flow characteristics. The amounts of protective colloid and regulator required to prepare the dispersions are particularly low. Aqueous polyacrylate dispersions are obtained which can be used particularly advantageously as paint binders and which, particularly in the preferred embodiment, are obtained in exceptionally consistent quality.

In the Examples which follow, parts and percentages are by weight.

EXAMPLE 1

The following aqueous phase is introduced as the initial charge into a reaction vessel equipped with a stirrer, reflux condenser, thermometer and three feed points: 50 parts of water, 0.2 part of thioglycolic acid, 4 parts of a 7% strength aqueous solution of hydroxyethylcellulose having a viscosity of 250 mPa.s, 2.5 parts of feed 1, 1.25 parts of feed 2 and 1.25 parts of feed 3.

Feed 1

27.5 parts of water, 55 parts of methyl methacrylate, 45 parts of 2-ethylhexyl acrylate, 1.5 parts of acrylic acid, 1 part of acrylamide, 4.5 parts of a 20% strength aqueous solution of p-isooctylphenol which has been oxyethylated with 25 moles of ethylene oxide and been sulfonated, 3 parts of a 20% strength aqueous solution of a sodium salt of a sulfonated hydrocarbon mixture containing from 13 to 17 carbon atoms, and 3 parts of a 20% strength aqueous solution of a $C_{14}$–$C_{16}$-alkanol oxyethylated with 12 moles of ethylene oxide.

Feed 2

15 parts of water and 0.5 part of potassium persulfate.

Feed 3

15 parts of water and 0.1 part of sodium formaldehyde-sulfoxylate.

The initial charge is heated to 50° C., whilst stirring, and is polymerized for 15 minutes. Feeds 1 to 3 are then introduced uniformly over 2–2½ hours, whilst stirring. When all has been added, polymerization is allowed to continue for 2 hours, the mixture is then cooled and the pH of the resulting dispersion is brought to 8–8.5 by adding 25% strength aqueous ammonia. The resulting aqueous polyacrylate dispersion is of 45% strength.

EXAMPLE 2

The procedure described in Example 1 is followed, but instead of 0.2 part of thioglycolic acid 3 parts of but-2-ene-1,4-diol are added as the regulator. An aqueous polyacrylate dispersion having a viscosity of 85 mPa.s is obtained.

EXAMPLE 3

The procedure described in Example 1 is followed, but instead of the sulfonated hydrocarbon, 0.5 part of a commercial polyvinyl alcohol, which contains 6% by weight of acetyl groups and has a viscosity of 27 mPa.s in 4% strength aqueous solution, is used as the protective colloid. A 45% strength aqueous polyacrylate dispersion having a viscosity of 150 mPa.s is obtained.

EXAMPLE 4

The procedure described in Example 1 is followed, but in feed 1 the total of 100 parts of methyl methacrylate and ethylhexyl acrylate is replaced by 50 parts of styrene and 50 parts of n-butyl acrylate. Using otherwise the same conditions as in Example 1, a 45% strength aqueous dispersion having a viscosity of 200 mPa.s is obtained.

EXAMPLE 5

An initial charge comprising 51 parts of water, 0.1 part of thioglycolic acid, 2 parts of hydroxyethylcellulose (having a viscosity of 330 mPa.s in 7% strength aqueous solution), 2.5 parts of feed 1, 1.25 parts of feed 2 and 1.25 parts of feed 3 is introduced into a reaction vessel like that described in Example 1.

Feed 1

60 parts of iso-butyl acrylate, 40 parts of methyl methacrylate, 2.5 parts of methacrylic acid, 1 part of acrylamide, 7.5 parts of a 20% strength aqueous solution of a $C_{14}$–$C_{16}$-alkanol oxyethylated with 12 moles of ethylene oxide, 5 parts of a 20% strength aqueous solution of an isooctylphenol which has been oxyethylated with 25 moles of ethylene oxide and been sulfonated, 26 parts of water, 0.1 part of thioglycolic acid and 2 parts of hydroxyethylcellulose (of the same type as in the initial charge).

Feed 2

15 parts of water and 0.7 part of potassium persulfate.

Feed 3

15 parts of water and 0.1 part of sodium formaldehyde-sulfoxylate.

In other respects, the procedure described in Example 1 is followed and a 45% strength aqueous polyacrylate dispersion having a viscosity of 300 mPa.s is obtained.

EXAMPLE 6

The procedure described in Example 5 is followed, but the total of 0.2 part of thioglycolic acid used in the said Example is divided as follows:

| | |
|---|---|
| initial charge: | 0.05 part |
| feed 1: | 0.05 part |
| feed 4: | 0.1 part. |

During the feed period, feed 4 is run continuously into feed 1 so that the thioglycolic acid concentration in feed 1 is increased continuously. Using otherwise the same procedure, a 45% strength aqueous polyacrylate dispersion having a viscosity of 600 mPa.s is now obtained.

EXAMPLE 7

The procedure described in Example 5 is followed, but isobutyl acrylate is used as the sole monomer. A 45% strength aqueous solution having a viscosity of 125 mPa.s is obtained.

EXAMPLE 8

The procedure described in Example 4 is followed, but the monomer used in feed 1 comprises 10 parts of vinyl propionate, 40 parts of n-butyl acrylate and 50 parts of methyl methacrylate. Under otherwise identical conditions, a 45% strength aqueous dispersion having a viscosity of 180 mPa.s is obtained.

EXAMPLE 9

The procedure described in Example 5 is followed, but the monomer used for feed 1 comprises 60 parts of n-butyl methacrylate and 40 parts of methyl methacrylate. Under otherwise identical conditions, an aqueous dispersion of about 45% strength, having a viscosity of 140 mPa.s, is obtained.

The dispersions of Examples 1 to 9 exhibit flow characteristics which show a distinct improvement over conventional "pure acrylate" dispersions.

We claim:

1. In a process for the preparation of aqueous polyacrylate dispersions having improved flow characteristics by emulsion polymerizing at least 20 weight % of an ester of acrylic acid and/or methacrylic acid and an alkanol of 1 to 10 carbon atoms at from 30° to 95° C. in the presence of a free radical polymerization inhibitor, a protective colloid, from 0.5 to 5% by weight of a nonionic emulsifier and a molecular weight regulator, the percentages by weight each being based on the total amount of monomer, the improvement which comprises: admixing at least a portion of the protective colloid present in a total amount of 0.05 to 1.5% by weight and a portion of the water soluble molecular weight regulator present in a total amount of 0.1 to 0.5% by weight with from 10-30 weight % of the total number to form an initial charge, and admixing the remainder of the monomer and of the said water-soluble molecular weight regulator and any remainder of the protective colloid with said initial charge.

2. The process of claim 1, wherein said water-soluble molecular weight regulator is admixed with said initial charge in increasing amount as a function of time.

3. The process of claim 1, wherein said monomer additionally contains from 0-50% by weight styrene, 0-20% by weight vinyl ester and 0-10% by weight of a water-soluble monoolefinically unsaturated comonomer selected from the group consisting of an $\alpha,\beta$-monoolefinically unsaturated monocarboxylic acid, an $\alpha,\beta$-monoolefinically unsaturated dicarboxylic acid, an amide of said monocarboxylic acid or said dicarboxylic acid, the nitrogen atom(s) of said amide optionally being substituted, a monoalkyl ester of said dicarboxylic acid, a vinyl sulfonic acid and water-soluble salts of said vinyl sulfonic acid.

4. The process of claim 1, wherein said protective colloid is selected from the group consisting of carboxymethylcellulose, hydroxyethylcellulose, polyvinyl alcohol, and water-soluble N-vinyl pyrrolidone polymers.

5. The process of claim 1, wherein said molecular weight regulator is selected from the group consisting of thioglycolic acid, thiodiglycol, but-1-ene-3-ol, isopropanol, vinylglycol, cyclohexylamine hydrochloride, hydroxylammonium sulfate, but-2-ene-1,4-diol and thiodiacetic acid.

6. The process of claim 1, wherein polymerization of said initial charge is initiated and thereafter the remainder of the monomer, water-soluble molecular weight regulator and protective colloid is continuously admixed with the initial charge at the rate at which polymerization proceeds.

7. The process of claim 1, wherein about half of the protective colloid is admixed in forming the initial charge and the remainder is added subsequently with the remainder of the monomer.

8. The product produced by the process of claim 1.

* * * * *